United States Patent
Sano et al.

(10) Patent No.: US 7,928,694 B2
(45) Date of Patent: Apr. 19, 2011

(54) CHARGING AND DISCHARGING CONTROL CIRCUIT AND CHARGING TYPE POWER SUPPLY DEVICE

(75) Inventors: Kazuaki Sano, Chiba (JP); Atsushi Sakurai, Chiba (JP); Toshiyuki Koike, Chiba (JP)

(73) Assignee: Seiko Instruments Inc. (JP)

( * ) Notice: Subject to any disclaimer, the term of this patent is extended or adjusted under 35 U.S.C. 154(b) by 654 days.

(21) Appl. No.: 12/070,671

(22) Filed: Feb. 20, 2008

(65) Prior Publication Data

US 2008/0224664 A1 Sep. 18, 2008

(30) Foreign Application Priority Data

Feb. 21, 2007 (JP) ................................. 2007-040576

(51) Int. Cl.
*H02J 7/00* (2006.01)
(52) U.S. Cl. ........................ 320/134; 320/135; 320/136
(58) Field of Classification Search ........... 320/134–136
See application file for complete search history.

(56) References Cited

U.S. PATENT DOCUMENTS

| 7,301,306 | B2 * | 11/2007 | Zhang | 320/134 |
| 7,550,947 | B2 * | 6/2009 | Sakurai et al. | 320/134 |
| 2001/0026147 | A1 * | 10/2001 | Nakashimo | 320/134 |
| 2002/0018329 | A1 | 2/2002 | Yoshida | 361/93.1 |
| 2002/0109483 | A1 * | 8/2002 | Nakashimo | 320/134 |
| 2002/0109484 | A1 * | 8/2002 | Yokota et al. | 320/134 |
| 2007/0145947 | A1 * | 6/2007 | Sakurai et al. | 320/132 |
| 2008/0036422 | A1 * | 2/2008 | Sakurai et al. | 320/134 |

FOREIGN PATENT DOCUMENTS

WO 0059093 10/2000

* cited by examiner

*Primary Examiner* — Edward Tso
*Assistant Examiner* — Samuel Berhanu
(74) *Attorney, Agent, or Firm* — Adams & Wilks

(57) ABSTRACT

An overcharge detecting comparator (121) detects an overcharged state of a battery (101), and an overcurrent detecting comparator (120) detects an overcurrent state of the battery (101). In response to output signals from those comparators, a control circuit (210) performs on/off control of each of a switch (102) and a protection circuit (50). In response to an output signal from the control circuit (210), the protection circuit (50) is turned on, to thereby connect a resistor (125) to a path connecting a VSS terminal and an overcurrent detecting terminal, and is turned off, to thereby disconnect the resistor (125) from the path. As a result, even when the battery is in the overcurrent state, current consumption can be reduced.

5 Claims, 3 Drawing Sheets

CHARGING AND DISCHARGING CONTROL CIRCUIT AND CHARGING TYPE POWER SUPPLY DEVICE

BACKGROUND OF THE INVENTION

1. Field of the Invention

The present invention relates to a charging and discharging control circuit that controls charging and discharging of a battery, and a charging type power supply device including the charging and discharging control circuit mounted thereto.

2. Description of the Related Art

A configuration of a charging type power supply device of a related art will be described. FIG. 5 is a diagram showing the charging type power supply device of the related art.

The charging type power supply device includes a battery 101, a charging and discharging control circuit 110, and a switch 102. The charging type power supply device is connected to a charger 104 or a load 103. The charging and discharging control circuit 110 includes a voltage divider circuit 111 having a resistor R1 and a resistor R2, a reference voltage circuit 122, an overcharge detecting comparator 121, a control circuit 210, an overcurrent detecting comparator 120, a reference voltage circuit 123, a resistor 124, a protection circuit 201 having a parasitic diode 202, a protection circuit 204 having a parasitic diode 205, and a charger detecting circuit 211 having a constant current source 208 and an N-type transistor 206.

The voltage divider circuit 111 divides a voltage of the battery 101. The reference voltage circuit 122 outputs a predetermined reference voltage to the overcharge detecting comparator 121, and the reference voltage circuit 123 outputs a predetermined reference voltage to the overcurrent detecting comparator 120. The overcharge detecting comparator 121 compares an output signal from the voltage divider circuit 111 with the reference voltage of the reference voltage circuit 122 to detect an overcharged state of the battery 101. The overcurrent detecting comparator 120 compares a voltage at an overcurrent detecting terminal with the reference voltage of the reference voltage circuit 123 to detect an overcurrent state of the battery 101. The control circuit 210 performs on/off control of each of the switch 102 and the protection circuit 201 in response to an output signal from each of the overcharge detecting comparator 121 and the overcurrent detecting comparator 120. The charger detecting circuit 211 detects connection of the charger 104. The protection circuit 201, which is an N-type transistor, is turned on in response to an output signal from the control circuit 210, to thereby connect the resistor 124 to a path connecting a VSS terminal and the overcurrent detecting terminal. The protection circuit 204, which is an N-type transistor, is turned off in response to an output signal from the charger detecting circuit 211, to thereby disconnect the resistor 124 from the path connecting the VSS terminal and the overcurrent detecting terminal.

Next, a description is given of operations of the charging type power supply device of the related art.

The charger 104 has a positive electrode connected to a VDD terminal, and a negative electrode connected to the overcurrent detecting terminal. The charger 104 is connected between an external terminal +VO and an external terminal −VO so as to charge the battery 101. When the voltage of the battery 101 is equal to or larger than a predetermined voltage and an output voltage of the voltage divider circuit 111 is equal to or larger than the reference voltage, the overcharge detecting comparator 121 detects the overcharged state of the battery 101. Then, the control circuit 210 controls the switch 102 to be turned off so as to cut off a charging current.

In this case, when it is assumed that the overcharged state of the battery 101 is detected and the switch 102 is turned off, and it is also assumed that the voltage of the battery 101 is 4.2 V and a voltage of the charger 104 is 6.0V, a voltage at the overcurrent detecting terminal can be expressed as follows.

$$4.2\,V - 6.0\,V = -1.8\,V$$

In this case, a gate voltage of the N-type transistor 206 is equal to a voltage (0 V) at the VSS terminal, a source voltage thereof is equal to a voltage (−1.8 V) at the overcurrent detecting terminal, and a voltage between a gate and a source thereof is 1.8 V. When the voltage between the gate and the source of the N-type transistor 206 is equal to or larger than a threshold voltage, the N-type transistor 206 is turned on. Then, a gate voltage and a source voltage of the protection circuit 204 is substantially equal to the voltage at the overcurrent detecting terminal, and the voltage between the gate and the source is 0 V. As a result, the protection circuit 204 is turned off. Accordingly, the resistor 124 is disconnected from the path connecting the VSS terminal and the overcurrent detecting terminal, and the path connecting the VSS terminal and the overcurrent detecting terminal through the parasitic diode 202, the resistor 124, and the protection circuit 204 is interrupted, whereby the charging current does not flow through the path.

However, when the overcurrent state of the battery 101 is detected by the overcurrent detecting comparator 120, and the voltage at the overcurrent detecting terminal rises up to about a voltage at the VDD terminal, the parasitic diode 205 of the protection circuit 204 is in a forward biased condition, and a forward current is caused to flow. Accordingly, a parasitic bipolar transistor of the protection circuit 204 is activated with the forward current being used as a base current, which results in an increase in current consumption.

In this case, a description is given of operations of the parasitic bipolar transistor of the protection circuit 204. FIG. 6 is a diagram showing the protection circuit of the related art.

When the voltage at the overcurrent detecting terminal rises up to about the voltage at the VDD terminal, the voltage of the N-type diffusion region 10, which is a source of the protection circuit 204, and the voltage of the P-type well 30, which is a back gate of the protection circuit 204, also rise up to about the voltage at the VDD terminal. As a result, the parasitic diode 205 of the protection circuit 204, which is formed of the P-type well 30 and the N-type diffusion region 20, is in the forward biased condition. The forward current is caused to flow from the P-type well 30 to the VSS terminal through the parasitic diode 205, the resistor 124, and the protection circuit 201. The forward current becomes a base current for the parasitic bipolar transistor which is formed of the P-type well 30 serving as a base, the N-type diffusion region 20 serving as an emitter, and an N-type substrate 40 serving as a collector. An emitter current obtained by multiplying the forward current by $h_{FB}$ flows through the N-type diffusion region 20 serving as an emitter. In this case, a collector current is supplied from the VDD terminal. Accordingly, the parasitic bipolar transistor of the protection circuit 204, which uses the forward current as a base current, is activated, which results in an increase in current consumption.

SUMMARY OF THE INVENTION

It is an object of the present invention to provide a charging and discharging control circuit and a charging type power supply device capable of reducing current consumption even when a battery is in an overcurrent state.

According to the present invention, in order to solve the above-mentioned problems, there is provided a charging and discharging control circuit for controlling charging and discharging of a battery, including: a voltage divider circuit for dividing a voltage of the battery; a first reference voltage circuit for outputting a first reference voltage; a second reference voltage circuit for outputting a second reference voltage; an overcharge detecting comparator for comparing an output signal of the voltage divider circuit with the first reference voltage to detect an overcharged state of the battery; an overcurrent detecting comparator for comparing a voltage at an overcurrent detecting terminal with the second reference voltage to detect an overcurrent state of the battery; a control circuit for performing on/off control of each of the switch provided between one of a charger and a load and the battery, and of a protection circuit provided between a VSS terminal and the overcurrent detecting terminal, in response to an output signal from each of the overcharge detecting comparator and the overcurrent detecting comparator; and the protection circuit which is turned on in response to an output signal from the control circuit so as to connect a resistor to a path connecting the VSS terminal and the overcurrent detecting terminal, and which is turned off in response to the output signal from the control circuit so as to disconnect the resistor from the path.

Further, according to the present invention, in order to solve the above-mentioned problems, there is provided a charging type power supply device, including: the switch; the battery; and the charging and discharging control circuit mounted to the charging type power supply device, for controlling charging and discharging of the battery.

In the present invention, when the battery is in the overcurrent state, a parasitic diode of the protection circuit does not cause a forward current to flow. As a result, a parasitic bipolar transistor of the protection circuit, which uses the forward current as a base current, is not activated, whereby the current consumption in the charging and discharging control circuit is prevented from increasing.

DETAILED DESCRIPTION OF THE PREFERRED EMBODIMENTS

Hereinafter, embodiments of the present invention will be described with reference to the drawings.

First Embodiment

Figure 1:
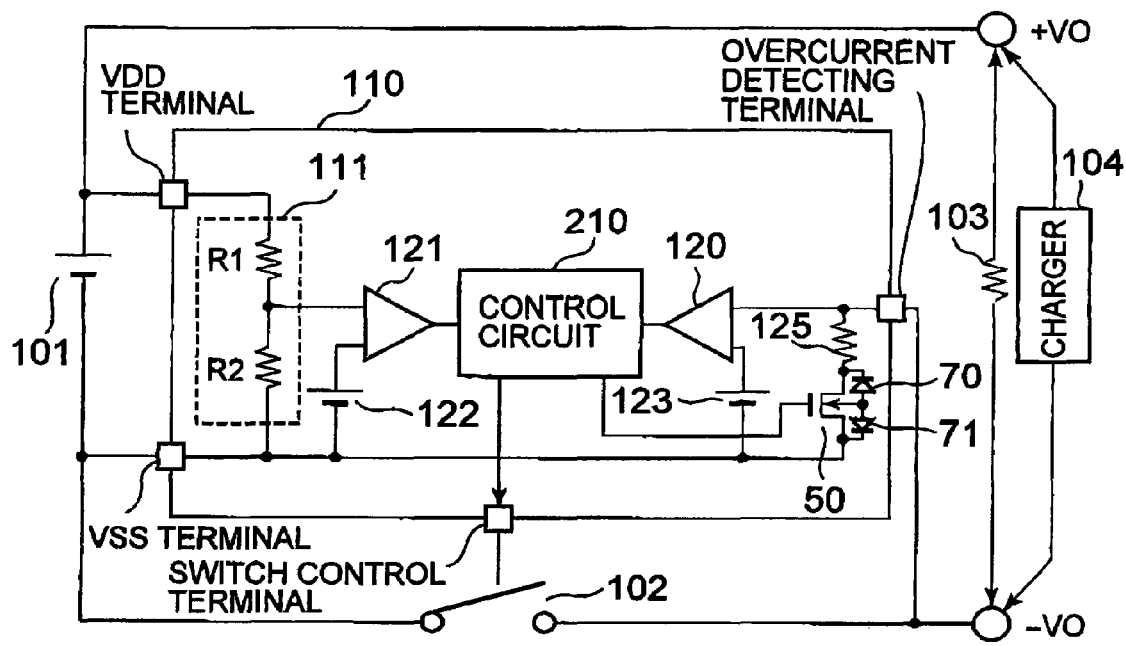
FIG. 1 is a diagram showing a charging type power supply device according to a first embodiment of the present invention.

First, a configuration of a charging type power supply device according to a first embodiment of the present invention will be described. FIG. 1 is a diagram showing the charging type power supply device according to the first embodiment of the present invention.

The charging type power supply device includes a battery 101, a charging and discharging control circuit 110, and a switch 102. The charging type power supply device is connected to a charger 104 or a load 103. The charging and discharging control circuit 110 includes a voltage divider circuit 111 having a resistor R1 and a resistor R2, a reference voltage circuit 122, an overcharge detecting comparator 121, a control circuit 210, an overcurrent detecting comparator 120, a reference voltage circuit 123, a resistor 125, and a protection circuit 50 having a parasitic diode 70 and a parasitic diode 71.

In this case, a back gate of the protection circuit 50 is connected to a source thereof through the parasitic diode 71, and is also connected to a drain thereof through the parasitic diode 70.

The divider circuit 111 divides a voltage of the battery 101. The reference voltage circuit 122 outputs a predetermined reference voltage to the overcharge detecting comparator 121, and the reference voltage circuit 123 outputs a predetermined reference voltage to the overcurrent detecting comparator 120. The overcharge detecting comparator 121 compares an output signal from the voltage divider circuit 111 with the reference voltage of the reference voltage circuit 122 to detect an overcharged state of the battery 110. The overcurrent detecting comparator 120 compares a voltage at an overcurrent detecting terminal with the reference voltage of the reference voltage circuit 123 to detect an overcurrent state of the battery 101. In response to an output signal from each of the overcharge detecting comparator 121 and the overcurrent detecting comparator 120, the control circuit 210 performs on/off control of each of the switch 102 and the protection circuit 50. In response to an output signal from the control circuit 210, the protection circuit 50, which is an N-type transistor, is turned on, to thereby connect the resistor 125 to a path connecting a VSS terminal and the overcurrent detecting terminal, and is turned off, to thereby disconnect the resistor 125 from the path.

Figure 2:
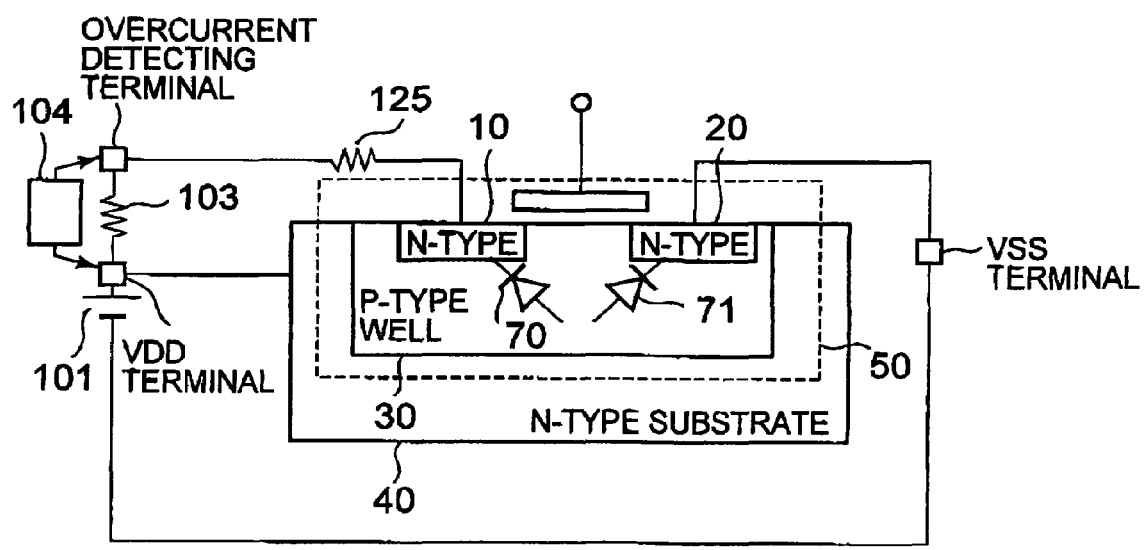
FIG. 2 is a diagram showing a protection circuit according to the first embodiment of the present invention.

Next, a description is given of operations of the charging type power supply device according to the first embodiment. FIG. 2 is a diagram showing the protection circuit according to the first embodiment.

The charger 104 has a positive electrode connected to a VDD terminal, and a negative electrode connected to the overcurrent detecting terminal. The charger 104 is connected between an external terminal +VO and an external terminal −VO so as to charge the battery 101. When the voltage of the battery 101 is equal to or larger than a predetermined voltage and an output voltage of the voltage divider circuit 111 is equal to or larger than the reference voltage of the reference voltage circuit 122, the overcharge detecting comparator 121 detects the overcharged state of the battery 101. Then, the control circuit 210 controls the switch 102 to be turned off so as to cut off a charging current.

In this case, when it is assumed that the overcharged state of the battery 101 is detected and the switch 102 is turned off, and it is also assumed that the voltage of the battery 101 is 4.2 V, and a voltage of the charger 104 is 6.0 V, a voltage at the overcurrent detecting terminal can be expressed as follows.

$$4.2\,V - 6.0\,V = -1.8\,V$$

In this case, when it is assumed that the control circuit 210 operates so that a gate voltage of the protection circuit 50 is equal to the voltage at the overcurrent detecting terminal, and it is also assumed that a voltage at an N-type diffusion region 10 is −1.8 V, a voltage at an N-type diffusion region 20 is 0 V, and a threshold voltage at the parasitic diode 70 is 0.5 V, a voltage at a P-type well 30 can be expressed as follows.

$$-1.8\text{ V}+0.5\text{ V}=-1.3\text{ V}$$

The parasitic diode 70 is in a forward biased condition, and the parasitic diode 71 is in a reverse biased condition. The gate voltage (−1.8 V) is lower than the voltage (−1.3 V) of the P-type well 30, so the protection circuit 50 is turned off. Accordingly, the resistor 125 is disconnected from the path connecting the VSS terminal and the overcurrent detecting terminal, and the path connecting the VSS terminal and the overcurrent detecting terminal through the protection circuit 50 and the resistor 125 is interrupted, whereby the charging current does not flow through the path.

Further, when the overcurrent state of the battery 101 is detected by the overcurrent detecting comparator 120 and the voltage at the overcurrent detecting terminal rises up to about a voltage at the VDD terminal, the control circuit 211 operates so that a gate voltage of the protection circuit 50 is equal to the voltage at the VDD terminal. The voltage at the overcurrent detecting terminal rises up to about the voltage at the VDD terminal, so the voltage of the N-type diffusion region 10 is higher than 0 V, and the voltage at the N-type diffusion region is 0 V. Accordingly, when it is assumed that the threshold voltage of the parasitic diode 71 is 0.5 V, the voltage of the P-type well is 0.5 V. In this case, the gate voltage is equal to the voltage at the VDD terminal and the gate voltage is higher than the voltage of the P-type well 30, so the protection circuit 50 is turned on. Assuming that an on-resistance of the protection circuit 50 is small enough to be ignored, when the protection circuit 50 is turned on, the voltage of the N-type diffusion region 10 is closer to the voltage at the VSS terminal. Because the protection circuit 50 is turned on, a current flowing from the positive electrode of the battery 101 to the VSS terminal through the load 103, the resistor 125, and the protection circuit 50 flows through a channel region of the protection circuit 50, and the parasitic diode 71 does not cause a forward current to flow. Accordingly, a parasitic bipolar transistor, which is formed of the P-type well 30 serving as a base, the N-type diffusion region 20 serving as an emitter, and an N-type substrate 40 serving as a collector, is not activated.

In the configuration, when the battery 101 is in the overcurrent state, the parasitic diode 71 of the protection circuit 50 does not cause the forward current to flow. As a result, the parasitic bipolar transistor of the protection circuit 50, which uses the forward current as a base current, is not activated, whereby current consumption in the charging and discharging control circuit is prevented from increasing.

Second Embodiment

Figure 3:
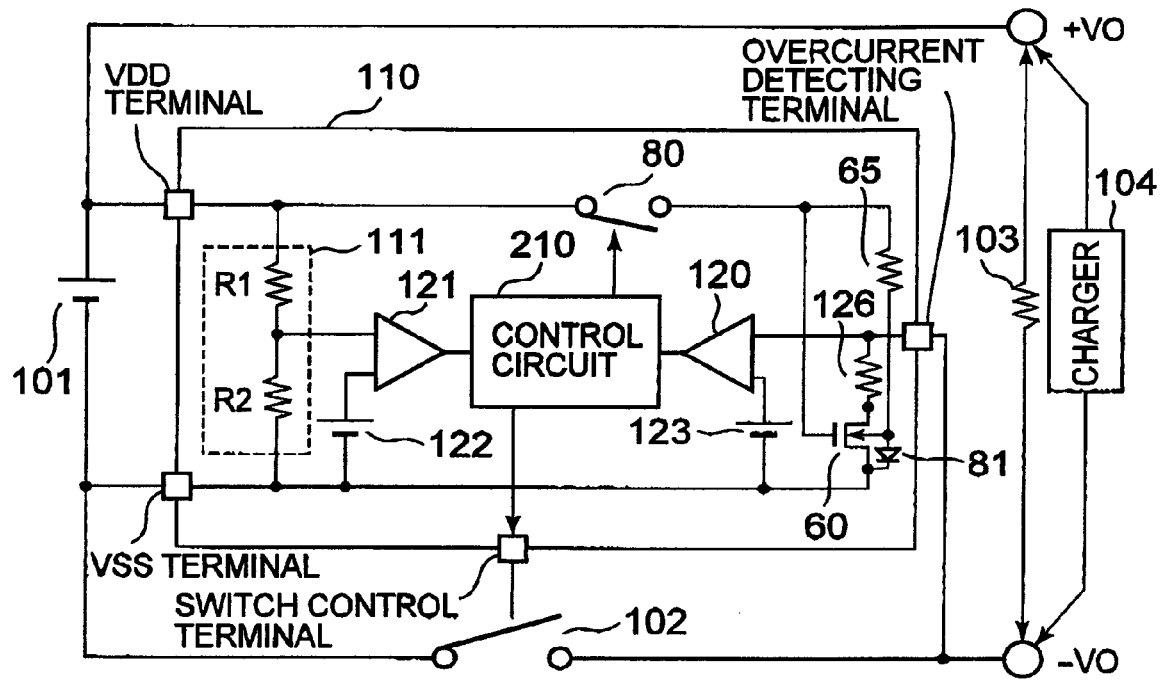
FIG. 3 is a diagram showing a charging type power supply device according to a second embodiment of the present invention.

Next, a configuration of a charging type power supply device according to a second embodiment of the present invention will be described. FIG. 3 is a diagram showing the charging type power supply device according to the second embodiment.

As compared with the charging type power supply device of the first embodiment, in the charging type power supply device of the second embodiment, the resistor 125, the protection circuit 50, and the parasitic diodes 70 and 71 are not provided, and a switch 80, a resistor 65, a resistor 126, a protection circuit 60, and a parasitic diode 81 are additionally provided.

In this case, a back gate of the protection circuit 60 is connected to a source thereof through the parasitic diode 81, and is also connected to a gate thereof through the resistor 65. A gate of the protection circuit 60 is connected to the VDD terminal through the switch 80.

The control circuit 210 performs on/off control of each of the switch 80 and the switch 102 in response to the output signal from each of the overcharge detecting comparator 121 and the overcurrent detecting comparator 120. In response to the output signal from the control circuit 210 through the switch 80, the protection circuit 60, which is an N-type transistor, is turned on, to thereby connect the resistor 126 to the path connecting the VSS terminal and the overcurrent detecting terminal, and is turned off, to thereby disconnect the resistor 126 from the path.

Figure 4:
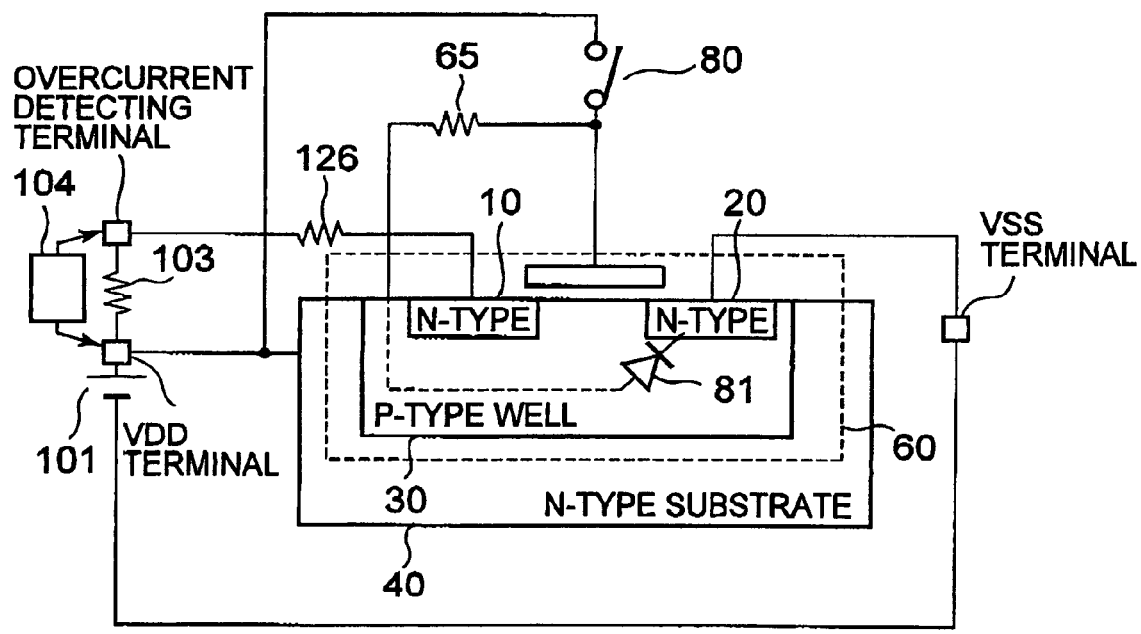
FIG. 4 is a diagram showing a protection circuit according to the second embodiment of the present invention.
Figure 5:
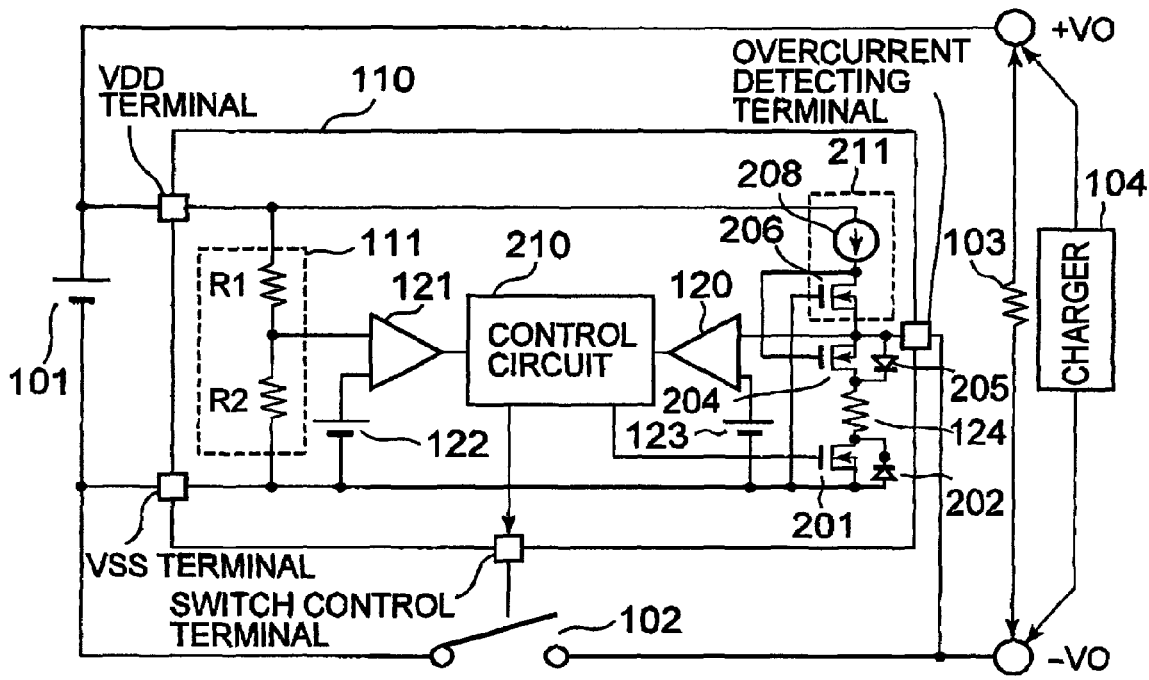
FIG. 5 is a diagram showing a charging type power supply device of a related art.
Figure 6:
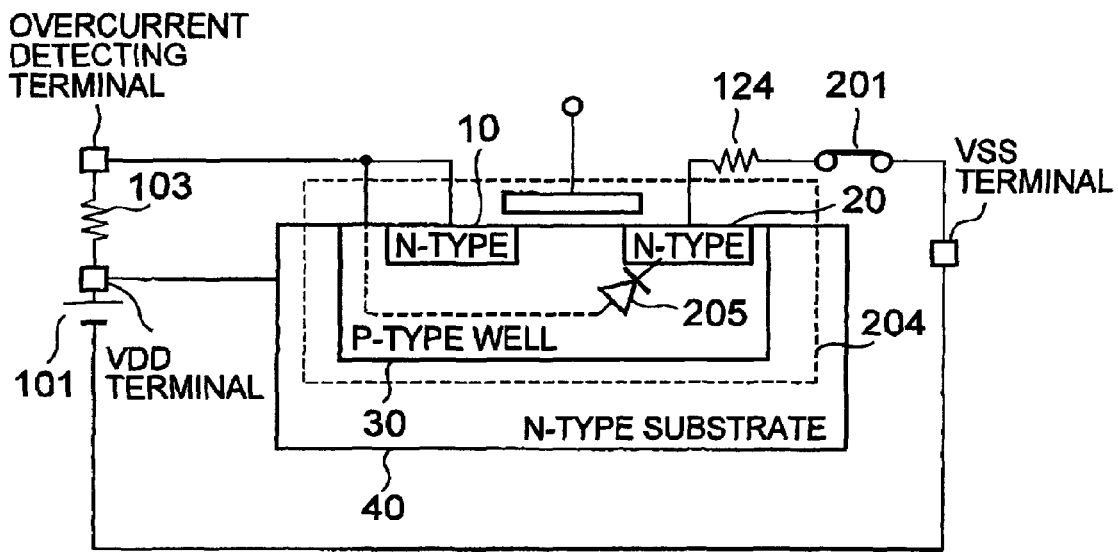
FIG. 6 is a diagram showing a protection circuit of the related art.

Next, a description is given of operations of the charging type power supply device according to the second embodiment. FIG. 4 is a diagram showing the protection circuit according to the second embodiment.

The charger 104 has a positive electrode connected to the VDD terminal, and a negative electrode connected to the overcurrent detecting terminal. The charger 104 is connected between an external terminal +VO and an external terminal −VO so as to charge the battery 101. When the voltage of the battery 101 is equal to or larger than the predetermined voltage and the output voltage of the voltage divider circuit 111 is equal to or larger than the reference voltage of the reference voltage circuit 122, the overcharge detecting comparator 121 detects the overcharged state of the battery 101. Then, the control circuit 210 controls the switch 102 to be turned off so as to cut off the charging current.

In this case, when it is assumed that the overcharged state of the battery 101 is detected and the switch 102 is turned off, the switch 80 is controlled to be turned off, and a gate voltage of the protection circuit 60 is substantially equal to a back gate voltage thereof, with the result that the protection circuit 60 is turned off. Accordingly, the resistor 126 is disconnected from the path connecting the VSS terminal and the overcurrent detection terminal, and the path connecting the VSS terminal and the overcurrent detecting terminal through the protection circuit 60 and the resistor 126 is interrupted, whereby the charging current does not flow through the path.

Further, when the overcurrent state of the battery 101 is detected by the overcurrent detecting comparator 120 and the voltage at the overcurrent detecting terminal rises up to about the voltage at the VDD terminal, the switch 80 is controlled to be turned on. Thus, the current flows from the VDD terminal to the VSS terminal through the resistor 65 and the parasitic diode 81. Assuming that a resistance value of the resistor 65 is 10 MΩ and the voltage of the battery 101 is 3.5 V, the current flowing through the resistor 65 can be substantially expressed as follows.

$$3.5\text{ V}/10\text{ M}\Omega=0.35\text{ μA}$$

Assuming that a voltage of 0.1 V is generated across the parasitic diode 81 when a forward current of 0.35 μA flows through the parasitic diode 81, the back gate voltage of the protection circuit 60 is 0.1 V. The gate voltage of the protection circuit 60 is 3.5 V, so the protection circuit 60 is turned on. The forward current of 0.35 μA is insufficient as a base current for activating the parasitic bipolar transistor which is formed of the P-type well 30 serving as a base, the N-type diffusion region 20 serving as an emitter, and the N-type substrate 40 serving as a collector, so the parasitic bipolar transistor is not activated.

In the configuration, when the battery 101 is in the overcurrent state, the forward current caused through the parasitic diode 81 of the protection circuit 60 is insufficient as the base current for activating the parasitic bipolar transistor of the protection circuit 60. Therefore, the parasitic bipolar transistor of the protection circuit 60, which uses the forward current as a base current, is not activated, with the result that the current consumption in the charging and discharging control is prevented from increasing.

What is claimed is:

1. A charging and discharging control circuit for controlling charging and discharging of a battery, comprising:
    a voltage divider circuit for dividing a voltage of the battery;
    a first reference voltage circuit for outputting a first reference voltage;
    a second reference voltage circuit for outputting a second reference voltage;
    an overcharge detecting comparator for comparing an output signal of the voltage divider circuit with the first reference voltage to detect an overcharged state of the battery;
    an overcurrent detecting comparator for comparing a voltage at an overcurrent detecting terminal with the second reference voltage to detect an overcurrent state of the battery;
    a control circuit for performing on/off control of each of the switch provided between one of a charger and a load and the battery, and of a protection circuit provided between a VSS terminal and the overcurrent detecting terminal, in response to an output signal from each of the overcharge detecting comparator and the overcurrent detecting comparator; and
    the protection circuit which is turned on in response to an output signal from the control circuit so as to connect a resistor to a path connecting the VSS terminal and the overcurrent detecting terminal, and which is turned off in response to the output signal from the control circuit so as to disconnect the resistor from the path.

2. A charging and discharging control circuit according to claim 1, wherein the protection circuit comprises an N-type transistor.

3. A charging and discharging control circuit according to claim 2, wherein the N-type transistor has a back gate which is connected to a source of the N-type transistor through a first parasitic diode, and which is also connected to a drain of the N-type transistor through a second parasitic diode.

4. A charging and discharging control circuit according to claim 2, wherein the N-type transistor has a back gate which is connected to a source of the N-type transistor through a parasitic diode, and which is also connected to a gate of the N-type transistor through a resistor.

5. A charging type power supply device, comprising:
    a switch;
    a battery; and
    a charging and discharging control circuit mounted to the charging type power supply device, for controlling charging and discharging of the battery, including:
        a voltage divider circuit for dividing a voltage of the battery;
        a first reference voltage circuit for outputting a first reference voltage;
        a second reference voltage circuit for outputting a second reference voltage;
        an overcharge detecting comparator for comparing an output signal of the voltage divider circuit with the first reference voltage to detect an overcharged state of the battery;
        an overcurrent detecting comparator for comparing a voltage at an overcurrent detecting terminal with the second reference voltage to detect an overcurrent state of the battery;
        a control circuit for performing on/off control of each of the switch provided between one of a charger and a load and the battery, and of a protection circuit provided between a VSS terminal and the overcurrent detecting terminal, in response to an output signal from each of the overcharge detecting comparator and the overcurrent detecting comparator; and
        the protection circuit which is turned on in response to an output signal from the control circuit so as to connect a resistor to a path connecting the VSS terminal and the overcurrent detecting terminal, and which is turned off in response to the output signal from the control circuit so as to disconnect the resistor from the path.

* * * * *